J. H. SHAW.
LOCK FOR GEAR SHIFT LEVERS AND THE LIKE.
APPLICATION FILED DEC. 1, 1919.
1,370,371.
Patented Mar. 1, 1921.
2 SHEETS—SHEET 1.
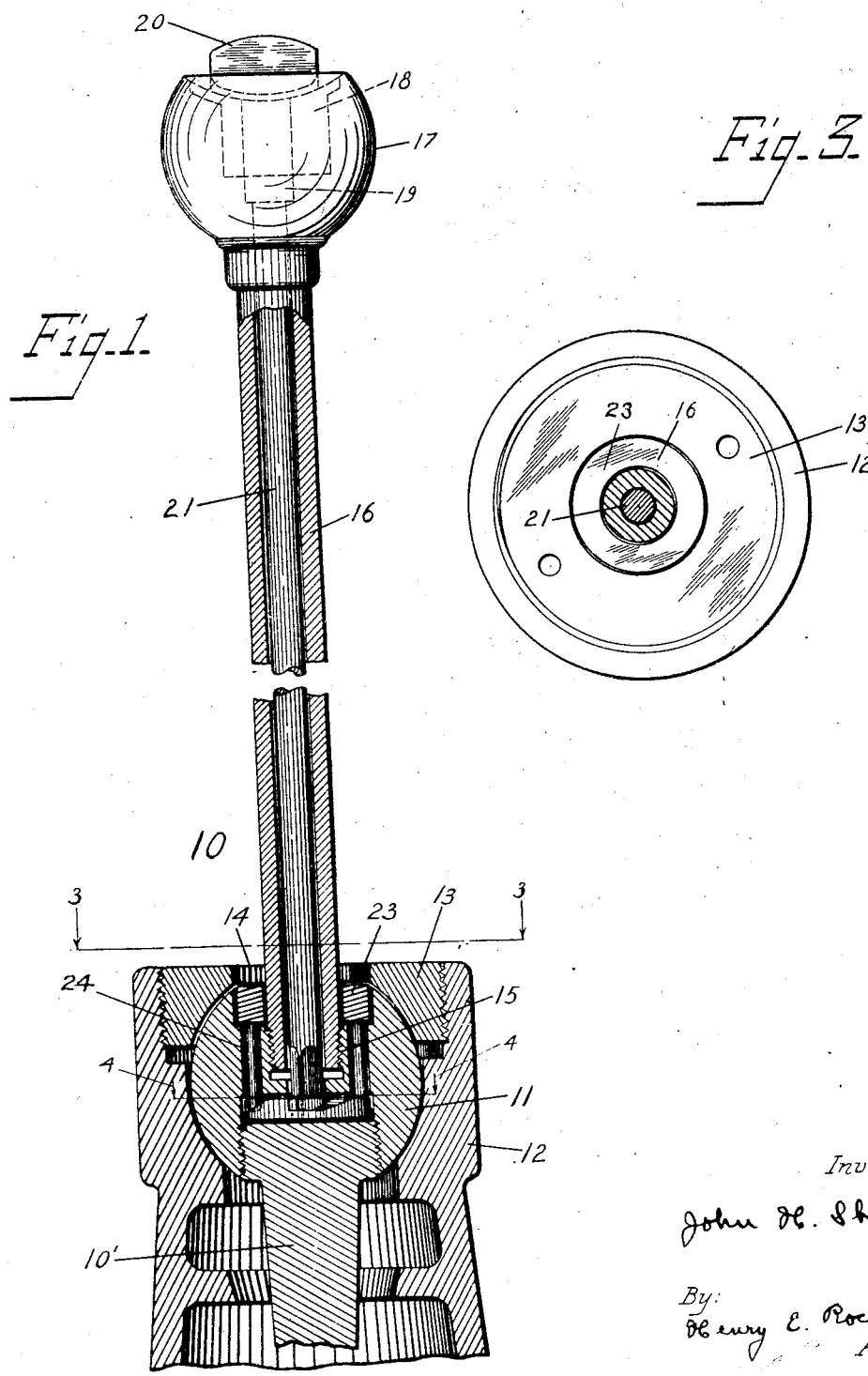
Inventor:
John H. Shaw
By:
Henry E. Rockwell
Attorney.

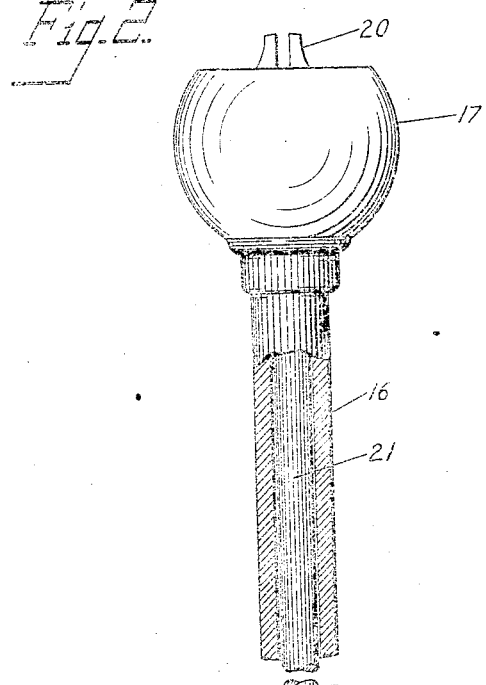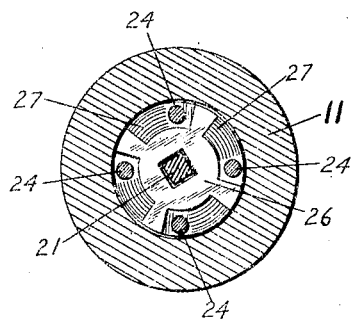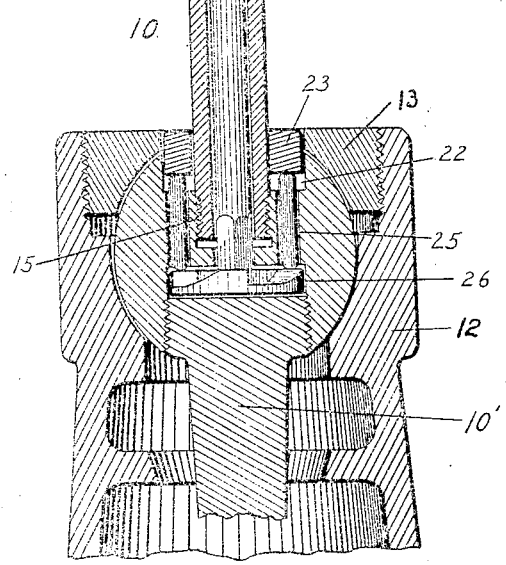

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS AND THE LIKE.

1,370,371.

Specification of Letters Patent.

Patented Mar. 1, 1921.

Application filed December 1, 1919. Serial No. 341,617.

*To all whom it may concern:*

Be it known that I, JOHN H. SHAW, a citizen of the United States, and residing in New Haven, county of New Haven, State of Connecticut, have invented certain new and useful Improvements in Locks for Gear-Shift Levers and the like, of which the following is a full, clear, and exact description.

This invention relates to a lever lock and more particularly to means for locking the gear shift lever of an automobile against unauthorized manipulation.

The primary object of my invention is to provide a gear shift lever with key-controlled means mounted within the lever for locking the same in its neutral position.

A more specific object of my invention is to provide locking means for a gear shift lever, consisting of key-controlled means positioned within the lever supporting bracket about the lever, and movable into a clearance space of the supporting bracket to block the operation of said lever.

Another object of my invention is to provide a gear shift lever with novel means for imparting longitudinal movement to a locking element by the rotation of a key barrel within its cylinder lock.

Still another object of my invention is to provide key-controlled means for locking a gear shift lever in its neutral position, which means is constructed to be moved by the force of gravity out of its locking position when the same is no longer supported in this position by the key-controlled mechanism.

To these and other ends, the invention consists in the novel features and combinations of parts to be hereinafter described and claimed.

In the accompanying drawings:

Figure 1 is a vertical sectional view through a gear shift lever and its supporting bearing member having my invention applied thereto, the parts being shown in their unlocked position.

Fig. 2 is a sectional view similar to Fig. 1, but showing the parts in their locked position.

Fig. 3 is a sectional view taken on the line 3—3 of Fig. 1 looking in the direction of the arrows.

Fig. 4 is a sectional view taken on the line 4—4 of Fig. 1 looking in the direction of the arrows.

In the embodiment of my invention illustrated in the drawings, I have designated by the numeral 10 a gear shift lever of the universal swinging type, the same being provided with a spherical bearing member 11 fulcrumed in a supporting bracket 12, but I desire to have it understood that I do not regard my invention as limited in its application to this particular type of lever.

The spherical bearing member 11 is preferably retained properly seated in its bracket 12 by a threaded ring or gland nut 13, a clearance space 14 being formed in this gland nut about the gear shift lever. The spherical bearing member 11 preferably has a threaded socket 15 formed therein in which the lower end of the tubular gear shift lever 16 is screwed. Upon the upper end of the tube 16 is mounted a knob such as 17, and in this knob is mounted a cylinder lock 18 provided with a key barrel 19, the same preferably being provided with the head 20 adapted to be grasped by the fingers in order to rotate the key barrel. Inside of the tube 16 is rotatably mounted the relatively long rod 21, having its upper end rigidly secured to the lower end of the key barrel by any preferred means. Within the upper face of the spherical bearing member is formed an annular groove 22 and in this groove is normally seated a ring or collar 23, the ring being so constructed that it normally lies within the groove 22 and entirely within the curvature of the outer spherical surface of the bearing member 11. The outer diameter of the collar 23 is substantially the same as the bore 14, above mentioned, formed within the gland nut 13, so that when the collar is raised to the position shown in Fig. 2, the clearance space formed in the gland nut 13 about the tube 16 is completely filled up, so that the lever 10 is in this manner prevented from being rocked within its supporting bracket 11. The means which I have shown for moving the collar 23 from the inoperative position shown in Fig. 1 to the operative position shown in Fig. 2 consists preferably of a plurality of pins 24 (four being shown in the embodiment of my invention illustrated) slidably mounted in vertically extending drill-holes 25, the upper ends of these pins being positioned to engage the lower face of the collar 23 and the lower ends of these pins are positioned to be operated by the 11 cam member 26 rotatably mounted within the spherical bearing member 11, the upper face of this cam member being provided with tapered operating surfaces or cams 27 positioned to operatively engage the lower ends of the pins 24. In order that the cam member 26 may be operatively secured to the key-controlled rod 21, a polygonally shaped opening is preferably formed centrally through this cam member in which the correspondingly shaped lower end of the rod 21 is received, the arrangement being such that when the rod 21 is rotated to position the cam faces 27 of the cam member 26, as shown in Fig. 1, the collar 23 will be permitted to be moved by the force of gravity to its normal position shown in Fig. 1 out of locking engagement with the gland nut 13 while when the parts are moved to the position shown in Fig. 2, the pins 24 are forced upward by the cam surfaces 27 to thereby raise the collar 23 into its locking position, as shown. In the embodiment of my invention illustrated, I have shown the spherical bearing member 11 as having a relatively large socket formed in the lower portion of the same in which the cam member 26 is rotatably mounted, and I have shown this socket as closed by the downwardly projecting portion 10' of the gear shift lever, which portion has its upper end threaded into the socket just mentioned.

From the foregoing description when read in connection with the drawings, it will be seen that the locking collar 23 normally lies within the curvature of the spherical bearing member 11 out of engagement with the gland nut 13, but when it is desired to lock the gear shift lever 10 in its neutral position, all that is necessary is to rotate the key barrel 19 to bring the locking mechanism into the position shown in Fig. 2, whereupon the collar 23 is raised into the clearance space 14 to thereby block the operation of the gear shift lever in all directions.

It will be apparent that various minor changes may be made in the device herein disclosed without departing from the scope of my invention as defined in the annexed claims.

What I claim is:

1. In combination with a gear shift lever, a supporting bracket in which said lever is fulcrumed, a locking ring mounted about said lever within said bracket, said bracket provided with a clearance space surrounding said lever, and key operable means for moving said ring into said clearance space to thereby block the movement of said lever.

2. In combination with a gear shift lever, a supporting bracket in which said lever is fulcrumed, means movably mounted about said lever within said bracket, said bracket provided with a clearance space surrounding said lever, and key operable means for moving said first mentioned means into said clearance space to thereby block the movement of said lever.

3. In combination with a gear shift lever, a supporting bracket in which said lever is fulcrumed, said bracket having a portion surrounding said lever above its fulcrum, locking means mounted within said bracket adjacent the lever fulcrum, and key operable means for moving said locking means away from the fulcrum of said lever into said portion of the bracket surrounding said lever to thereby block the movement of said lever.

4. In combination with a gear shift lever, provided with a spherical bearing member, a supporting bracket in which said bearing member is fulcrumed, said bracket provided with a clearance space surrounding said lever, locking means constructed to normally lie within said spherical bearing member, and key operable means for moving said locking means into said clearance space to thereby retain said lever in its neutral position.

5. In combination with a gear shift lever provided with a spherical bearing member, a supporting bracket in which said bearing member is fulcrumed, means movable longitudinally of said lever into engagement with said bracket to block the movement of said lever, and key-controlled means for operating said first mentioned means including a cam member rotatably mounted within said spherical bearing member.

6. In combination with a gear shift lever, a supporting bracket in which said lever is fulcrumed, means movable longitudinally of said lever into locking engagement with said bracket, key-controlled means including a cam member supported to rotate within said lever, and means operable by said cam member for moving said first mentioned means into position to lock said lever against movement.

7. In combination with a gear shift lever, provided with a spherical bearing member, a supporting bracket in which said bearing member is fulcrumed, a locking ring mounted about said lever and constructed to normally lie within said spherical bearing member, said bracket provided with a clearance space surrounding said lever, and key-controlled means including a cam member rotatably mounted within said spherical bearing member for moving said ring into said clearance space to thereby retain said lever in its neutral position.

8. In combination with a gear shift lever, a supporting bracket in which said lever is fulcrumed, means movable longitudinally of said lever into engagement with said bracket to prevent the operation of said lever, and key-controlled means for operating said first mentioned means including a cam member carried by said lever and rotatable about the longitudinal axis of said lever, said cam member having tapered operating surfaces formed upon a lateral face thereof.

9. In combination with a gear shift lever, a supporting bracket in which said lever is fulcrumed, said bracket provided with a relatively large opening through which said lever projects, a key-controlled rod extending longitudinally of said lever, a cam member mounted within the portion of said lever housed by the supporting bracket and operatively engaged by said rod, and a locking member surrounding said lever and movable into said opening to block the movement of said lever, said locking member movable into its locking position by said cam member.

10. In combination with a gear shift lever, a supporting bracket in which said lever is fulcrumed, said bracket provided with a clearance space surrounding said lever, means mounted about said lever and constructed to be moved into said clearance space to prevent movement of said lever therein, and key-controlled mechanism for raising said means into operative position, said means movable by gravity to its inoperative position.

11. In combination, a gear shift lever, a supporting bracket therefor, said bracket presenting a clearance opening about said lever, means mounted about said lever and adapted to be moved into said clearance opening to lock said lever against movement, key-controlled mechanism for camming said means upwardly into locking position, said means dropping by gravity to unlocked position when said camming means is in inoperative position.

12. In combination, a gear shift lever, a supporting bracket therefor, said bracket presenting a clearance opening about said lever, a locking ring mounted about said lever below said opening, a cam member rotatably mounted within said lever, means to rotate said cam member to force said ring upwardly into said opening.

13. In combination, a supporting bracket, a lever provided with a spherical bearing member supported thereby, said bracket providing a clearance space about said lever above the spherical bearing member to permit movement of the lever, and means, within said bearing member, movable upward into said clearance space to block movement of said lever.

In witness whereof I have hereunto set my hand on the 28 day of November, 1919.

JOHN H. SHAW.